United States Patent [19]
Andersson

[11] Patent Number: 4,944,642
[45] Date of Patent: Jul. 31, 1990

[54] BEARING ARRANGEMENT IN ROTARY MACHINES

[75] Inventor: Börje Andersson, Husvägen, Sweden

[73] Assignee: SKF Nova AB, Gothenburg, Sweden

[21] Appl. No.: 344,221

[22] Filed: Apr. 27, 1989

[30] Foreign Application Priority Data

May 11, 1988 [SE] Sweden ................................ 8801787

[51] Int. Cl.$^5$ ............................................. B23B 45/16
[52] U.S. Cl. .................................. 408/241 R; 173/104;
394/31; 394/516; 394/615
[58] Field of Search .................... 173/48, 104; 384/31,
384/513, 515, 516, 615; 408/234, 241 R

[56] References Cited

U.S. PATENT DOCUMENTS 2,316,449 4/1943 Parker ................................. 384/516
4,073,348 2/1978 Schramm et al. ..................... 173/48

Primary Examiner—Steven C. Bishop
Attorney, Agent, or Firm—Eugene E. Renz, Jr.

[57] ABSTRACT

A rotary machine, such as a hammer drill, comprises a tool-carrying shaft (12), which is rotatably supported in the machine housing (11) by means of a ball bearing (24). The outer race ring (25) and the inner race ring (26) of the bearing are axially secured in the housing (11) and on the shaft (12) respectively. In order to make possible a limited axial movement of the shaft (12) relative to the housing (11) one of the race tracks (27) of the inner race ring (26) and the outer race ring (25) is formed cylindrical.

7 Claims, 2 Drawing Sheets

4,944,642

BEARING ARRANGEMENT IN ROTARY MACHINES

FIELD OF THE INVENTION

The present invention relates to a device in rotary machines, such as hammer drills, comprising a shaft adapted to carry a tool, which shaft is rotatably supported in the machine housing by means of at least one ball bearing and axially reciprocable to a limited extent relative to the housing, whereby the outer race ring of the ball bearing is axially non-movably fitted in the housing.

BACKGROUND OF THE INVENTION

In earlier known devices in rotary machines of this type the tool-carrying shaft is supported in the machine housing by means of friction bearings, ball bearings or ball and fiction bearings. Examples of the two first mentioned types of bearings are shown in DE-A-2328462 and DE-A-2110015.

SUMMARY OF THE INVENTION

The present invention relates to the second one of the above-mentioned types of bearings, i.e. a ball bearing arrangement. The purpose of the invention is to eliminate the drawbacks, which occur in hitherto known designs, primarily play occurring between shaft and bearing. This and other purposes of the invention are obtained by giving the invention the characterizing features stated in the claims.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
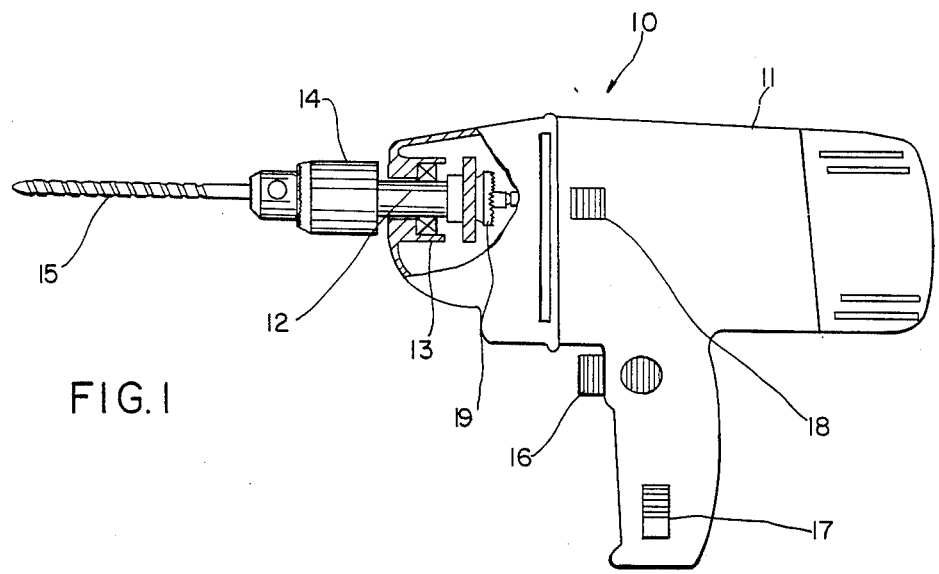
FIG. 1 shows a side view, partly in section, of a rotary machine in which the invention advantageously can be applied.

Corresponding details have been given the same reference numerals in the different figures.

The rotary machine shown in FIG. 1 and generally designated 10 is a hammer drill comprising a housing 11, in which a chuck shaft 12 is rotatably supported in a bearing 13. A tool in the form of a drill 15 is fitted in the chuck 14, which is carried by the shaft 12. The machine 10 is in conventional manner equipped with a knob 16 for switching on and switching off, a reversing switch 17 for reversing the rotational direction of the shaft 12 and a switch 18 for the hammer function of the machine. The impacts acting upon the drill 15 are generated by means of a hammer apparatus which comprises an impact generating disc 19. The hammer apparatus and the rest of the hammer drill except for the bearing 13 may be designed as shown in DE-A-2110015 and DE-A-2328462. Therefore these publications are incorporated in the present specification by way of reference.

Figure 2:
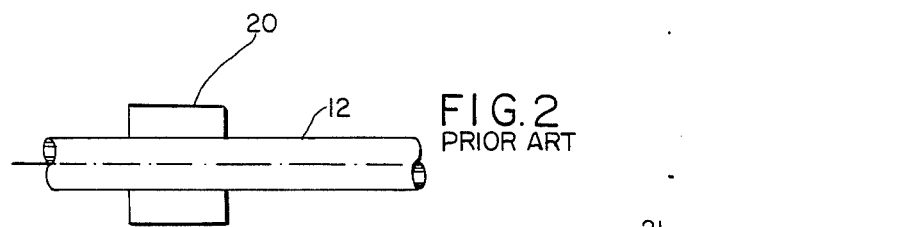
FIGS. 2, 3, and 4 illustrate schematically the types of bearings which are normally used for supporting the rotatable shaft in the machine shown in FIG. 1.

In the chuck support schematically shown in FIG. 2 the rotatable shaft 12 is supported in a friction bearing 20, which takes up axial as well as rotational movements. This supporting principle is inexpensive. However, it involves considerable drawbacks in form of a highly limited life span and big losses caused by high heat generation. As mentioned above this type of support is used in the design shown in DE-A-2328462.

Figure 3:
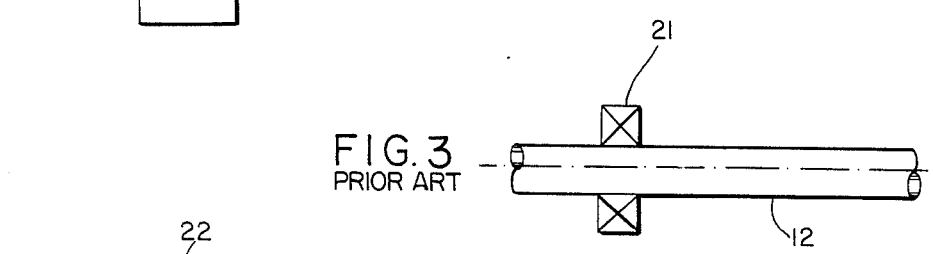

In the chuck support schematically shown in FIG. 3 the rotation of the shaft 12 is taken up by a deep groove ball bearing of conventional type. In order to allow the required axial movability of the shaft 12 the fit between the shaft 12 and the inner race ring of the bearing 21 is such that the shaft 12 can slide inside said race ring. The heat generation and thus the losses are smaller than those at the sliding bearing support shown in FIG. 2. However, there will occur play upon wear of the shaft and the bearing, which means that the prerequisites for a good function of the bearing are considerably impaired.

Figure 4:
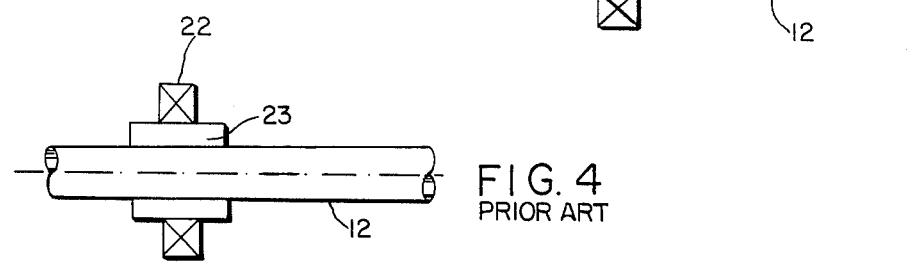

In the ball and friction between support schematically shown in FIG. 4 the rotation of the shaft 12 is taken up by a deep groove ball bearing 22 mounted in the machine housing. In the inner race ring of the bearing 22 is mounted a friction bearing 23. The friction bearing 23 is designed with grooves intended to receive corresponding pins in the ball bearing 22. The ball bearing 22 thus rotates as if it was fixedly mounted on the shaft 12, at the same time as its slidable mounting in the bearing 23 permits reciprocating movements. This supporting principle partly eliminates the drawbacks of the supporting principles described in connection with FIGS. 2 and 3. For cost reasons, however, this supporting principle is used only in very expensive machines intended for professional use.

Figure 7:
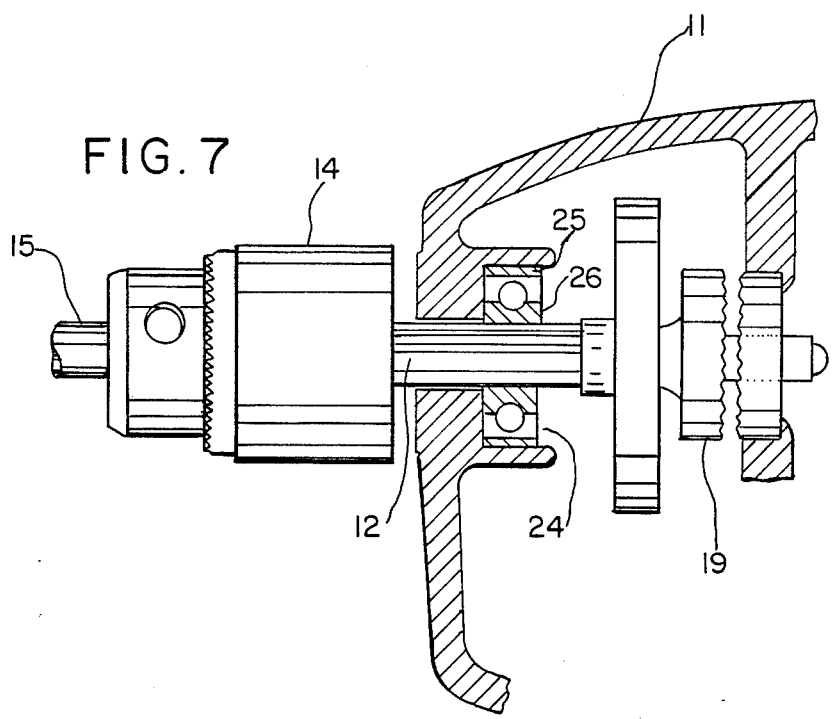
FIG. 7 illustrates schematically one embodiment of a device according to the invention.

In the earlier known ball bearing support illustrated in FIG. 3, the outer race ring of the bearing 21 is axially secured in the housing 11, whereas there is a sliding fit between shaft 12 and the inner race ring of the bearing 21, as mentioned above. In the embodiment of a device according to the invention illustrated in FIGS. 5 and 7 the tool-carrying shaft 12 is rotatably supported in a ball bearing 24. The outer race ring 25 of the ball bearing 24 is axially secured in the housing 11 in a manner known per se. According to the invention the inner race ring 26 of the ball bearing 24 is axially secured relative to the shaft 12. In order to make possible the required limited reciprocatory movement of the shaft 12 the race 27 of the outer race ring 25 is formed cylindrical. As an alternative it is possible to give the race of the inner race ring a cylindrical form, whereby a conventional groove is formed in the outer race ring.

Figure 5:
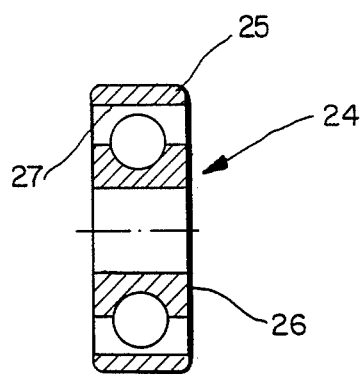
FIG. 5 shows a bearing, which can be used in a device according to the invention.
Figure 6:
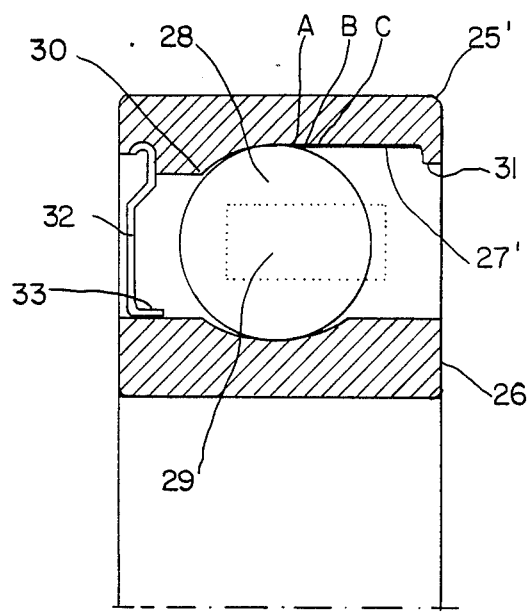
FIG. 6 shows a preferred embodiment of a bearing, which advantageously can be used in a device according to the invention.

FIG. 5 shows the general design of a ball bearing for use in a device according to the invention. In FIG. 6 the upper half of a preferred embodiment of a ball bearing is shown. The inner race ring 26 is of conventional design. The outer ring 25' has a cylindrical track 27' for the balls 28. The balls 28 are held in place by means of a cage 29.

In order to take up reversed axial load when the chuck 14 is pulled the outer ring 25' is provided with a shoulder 30. At the other end the outer ring is provided with a lug 31 which prevents the bearing from falling apart. At the end of the bearing facing the tool 15 there is mounted a seal 32 of a labyrinth-type. The seal 32 has a long axially extending portion 33 which makes the seal effective also when the outer ring 25' is displaced.

During non-hammer operation the balls 28 run generally along a line A on the race 27' and are out of engagement with the shoulder 30. During hammer action the balls 28 move back and forth between lines B and C on the race 27'. In circumferential direction, thus, the contact line between the balls 28 and the race 27' will be wave-shaped. When applied in hammer drills the impact amplitude, i.e. the distance between lines B and C, is in the order of 0.7 mm.

In a preferred embodiment of the invention the thickness of the outer race ring 25 is smaller than the thickness of the inner race ring 26, preferably between 25% and 75% of the thickness of the inner race ring. In the illustrated embodiment the thickness of the outer race ring 25 is substantially as big as the thickness of the inner race ring 26 at the middle of the race track. The required radial space is thereby reduced when compared to the space required for conventional deep groove ball bearings.

In the illustrated embodiment the inner race ring 26 as well as the outer race ring 25 are mounted with press fit on the shaft 12 and in the housing 11 respectively. It is of course possible to use other known mounting methods as alternatives. Further, the invention is not limited to hammer drills but could be applied also in other machines wherein a tool-carrying shaft is reciprocable axially to a limited extent.

What is claimed is:

1. A hammer drill mechanism comprising an elongated shaft adapted to carry a tool at one end, means rotatably supporting the shaft in a housing, means mounting the shaft in the housing for limited reciprocatory movement, said mounting means comprising at least one ball bearing having an outer race ring securely fitted in the housing and an inner race ring securely fitted on the shaft, means defining confronting raceways for the balls, at least one of said raceways having a cylindrical portion formed as an extension of the raceway permitting back and forth axial movement of the balls relative to the raceways when the mechanism is functioning as a hammer drill.

2. A device according to claim 1, wherein the raceway of the outer ring is cylindrical at least along the axial extension (A-C) of the contact line of the balls along said raceway during operation of the hammer drill mechanism.

3. A device according to claim 2, wherein the thickness of the outer race ring is smaller than the thickness of the inner race ring.

4. A device according to claim 3, wherein the thickness of the outer race ring is between 25% and 75% of the thickness of the inner race ring.

5. A device according to claim 3, wherein the thickness of the outer race ring is substantially as great as the thickness of the inner race ring at the middle of the raceway.

6. A device according to claim 1, characterized in that the ball bearing is arranged in the front end of the housing for supporting the chuck shaft of the hammer drill mechanism.

7. A device according to claim 1, wherein said raceways are arcuate.

* * * * *